(12) United States Patent
Lee et al.

(10) Patent No.: US 7,738,714 B2
(45) Date of Patent: Jun. 15, 2010

(54) METHOD OF AND APPARATUS FOR LOSSLESS VIDEO ENCODING AND DECODING

(75) Inventors: Yung-lyul Lee, Seoul (KR); Dae-yeon Kim, Seoul (KR); Ki-hun Han, Seoul (KR); Jae-ho Hur, Paju-si (KR)

(73) Assignees: Industry-Academia Coorperation Group of Sejong University, Seoul (KR); Samsung Electronics Co., Ltd., Suwon-si (KR)

( * ) Notice: Subject to any disclaimer, the term of this patent is extended or adjusted under 35 U.S.C. 154(b) by 951 days.

(21) Appl. No.: 11/516,603

(22) Filed: Sep. 7, 2006

(65) Prior Publication Data
US 2007/0065026 A1 Mar. 22, 2007

(30) Foreign Application Priority Data
Sep. 16, 2005 (KR) ...................... 10-2005-0087003

(51) Int. Cl.
*G06K 9/36* (2006.01)
(52) U.S. Cl. .................................................... 382/236
(58) Field of Classification Search ......... 382/232–233, 382/236, 238–240, 244–248, 250–252; 348/394.1–395.1, 348/400.1–404.1, 408.1–410.1, 412.1, 415.1, 348/430.1; 375/240.02, 240.12–240.13, 375/240.18–240.23
See application file for complete search history.

(56) References Cited

U.S. PATENT DOCUMENTS

| 6,606,414 B1 * | 8/2003 | Pandel et al. ................. 382/238 |
| 7,577,305 B2 * | 8/2009 | Srinivasan ................... 382/238 |
| 2004/0151247 A1 | 8/2004 | Sanson et al. |
| 2005/0013370 A1 | 1/2005 | Kim et al. |

FOREIGN PATENT DOCUMENTS

| GB | 2 339 989 A | 2/2000 |
| JP | 2001-077700 A | 3/2001 |
| JP | 2001-094995 A | 4/2001 |
| KR | 10-2005-0009216 A | 1/2005 |

* cited by examiner

*Primary Examiner*—Jose L Couso
(74) *Attorney, Agent, or Firm*—Sughrue Mion, PLLC (57) ABSTRACT

Provided are a method of and apparatus for lossless video encoding and decoding, in which a differential residual block generated by calculating a difference between pixels of a residual block resulting from interprediction is encoded, thereby improving the compression rate. The method of lossless video encoding includes performing interprediction between a reference frame and a current frame in units of a predetermined-size block to generate a predicted block of a current block to be encoded, generating a residual block composed of residual signals corresponding to differences between pixels of the predicted block and the current block, calculating differences between the residual signals of the residual block in a predetermined direction and generating a differential residual block based on the calculated differences, and performing entropy-encoding on the differential residual block.

23 Claims, 9 Drawing Sheets

$\swarrow^{300}$

| $r_{0,0}$ | $r_{0,1}$ | $r_{0,2}$ | $r_{0,3}$ | $r_{0,4}$ | · | · | · | · | · | · | · | · | · | $r_{0,14}$ | $r_{0,15}$ |
|---|---|---|---|---|---|---|---|---|---|---|---|---|---|---|---|
| $r_{1,0}$ | $r_{1,1}$ | $r_{1,2}$ | $r_{1,3}$ | $r_{1,4}$ | | | | | | | | | | | $r_{1,15}$ |
| $r_{2,0}$ | $r_{2,1}$ | $r_{2,2}$ | $r_{2,3}$ | $r_{2,4}$ | | | | | | | | | | | $r_{2,15}$ |
| $r_{3,0}$ | $r_{3,1}$ | $r_{3,2}$ | $r_{3,3}$ | $r_{3,4}$ | | | | | | | | | | | $r_{3,15}$ |
| | | | | | · | | | | | | | | | | |
| | | · | | | | · | | | | | | | | | · |
| | | · | | | | | | | | | | | | | · |
| | | · | | | | | · | | | | | | | | · |
| | | · | | | | | | | | | | | | | · |
| | | · | | | | | | | · | | | | | | · |
| | | · | | | | | | | | | | | | | · |
| | | · | | | | | | | | | | · | | | · |
| | | · | | | | | | | | | | | | · | · |
| | | · | | | | | | | | | | | | · | · |
| | | · | | | | | | | | | | | | · | |
| $r_{15,0}$ | $r_{15,1}$ | $r_{15,2}$ | $r_{15,3}$ | $r_{15,4}$ | · | · | · | · | · | · | · | · | · | · | $r_{15,15}$ |

| | | | | | | | | | | | | | | | |
|---|---|---|---|---|---|---|---|---|---|---|---|---|---|---|---|
| $r_{0,0}$ | $r_{0,1}$ | $r_{0,2}$ | $r_{0,3}$ | . | . | . | . | . | . | . | . | . | . | . | $r_{0,15}$ |
| $r_{1,0}$ $-r_{0,0}$ | $r_{1,1}$ $-r_{0,1}$ | $r_{1,2}$ $-r_{0,2}$ | $r_{1,3}$ $-r_{0,3}$ | | | | | | | | | | | | $r_{1,15}$ $-r_{0,15}$ |
| $r_{2,0}$ $-r_{1,0}$ | $r_{2,1}$ $-r_{1,1}$ | $r_{2,2}$ $-r_{1,2}$ | $r_{2,3}$ $-r_{1,3}$ | | | | | | | | | | | | $r_{2,15}$ $-r_{1,15}$ |
| $r_{3,0}$ $-r_{2,0}$ | $r_{3,1}$ $-r_{0,2}$ | $r_{3,2}$ $-r_{2,2}$ | $r_{3,3}$ $-r_{2,3}$ | | | | | | | | | | | | $r_{3,15}$ $-r_{2,15}$ |
| | | | | . | | | | | | | | | | | |
| | | . | | | . | | | | | | | | | | . |
| | | . | | | | | . | | | | | | | | . |
| | | . | | | | | | | . | | | | | | . |
| | | . | | | | | | | | | | | | | |
| | | . | | | | | | | | | | | | | . |
| | | . | | | | | | | | | | | | | . |
| | | . | | | | | | | | | | | . | | . |
| | | . | | | | | | | | | | | | . | . |
| | | . | | | | | | | | | | | | . | |
| $r_{15,0}$ | $r_{15,1}$ | $r_{15,2}$ | $r_{15,3}$ | . | . | . | . | . | . | . | . | . | . | . | $r_{15,15}$ |
| $-r_{14,0}$ | $-r_{14,1}$ | $-r_{14,2}$ | $-r_{14,3}$ | | | | | | | | | | | | $-r_{14,15}$ |

| $r'_{0,0}$ | $r'_{0,1}$ | $r'_{0,2}$ | $r'_{0,3}$ | | . | . | . | . | . | . | . | . | . | | $r'_{0,15}$ |
|---|---|---|---|---|---|---|---|---|---|---|---|---|---|---|---|
| $r'_{1,0}$ | $r'_{1,1}$ | $r'_{1,2}$ | $r'_{1,3}$ | | | | | | | | | | | | $r'_{1,15}$ |
| $r'_{2,0}$ | $r'_{2,1}$ | $r'_{2,2}$ | $r'_{2,3}$ | | | | | | | | | | | | $r'_{2,15}$ |
| $r'_{3,0}$ | $r'_{3,1}$ | $r'_{3,2}$ | $r'_{3,3}$ | | | | | | | | | | | | $r'_{3,15}$ |
| | | | | . | | | | | | | | | | | |
| | | . | | | | . | | | | | | | | | . |
| | | . | | | | | | | | | | | | | . |
| | | . | | | | | . | | | | | | | | |
| | | . | | | | | | | | | | | | | |
| | | . | | | | | | | | | | | | | |
| | | . | | | | | | | | | | . | | | . |
| | | . | | | | | | | | | | | | . | . |
| | | . | | | | | | | | | | | | . | |
| | | . | | | | | | | | | | | | | |
| $r'_{15,0}$ | $r'_{15,1}$ | $r'_{15,2}$ | $r'_{15,3}$ | | . | . | . | . | . | . | . | . | . | | $r'_{15,15}$ |

METHOD OF AND APPARATUS FOR LOSSLESS VIDEO ENCODING AND DECODING

CROSS-REFERENCE TO RELATED PATENT APPLICATION

This application claims priority from Korean Patent Application No. 10-2005-0087003, filed on Sep. 16, 2005, in the Korean Intellectual Property Office, the disclosure of which is incorporated herein in its entirety by reference.

BACKGROUND OF THE INVENTION

1. Field of the Invention

The present invention relates to encoding and decoding of video data and, more particularly, to a method of and apparatus for lossless video encoding and decoding, in which a differential residual block generated by calculating a difference between pixels of a residual block resulting from interprediction is encoded, thereby improving the compression rate.

2. Description of the Related Art

H.264/moving picture expert group (MPEG)-4/advanced video coding (AVC), one of the video compression standards, uses various techniques such as multiple reference motion compensation, loop filtering, variable block size motion compensation, and context adaptive binary arithmetic coding (CABAC) to improve the compression rate.

According to the H.264 standard, a picture is divided into macroblocks for video encoding. After each of the macroblocks is encoded in all interprediction and intraprediction encoding modes, an appropriate encoding mode is selected according to the bit rates required for encoding the macroblocks and the degree of distortion between the original macroblock and a decoded macroblock. Then, the macroblock is encoded in the selected encoding mode. Interprediction involves performing prediction on a macroblock of a current frame by referring to a macroblock of a neighboring frame. Intraprediction involves performing prediction on a current macroblock of a current frame using a neighboring macroblock of the current macroblock within the current frame.

Video encoding includes lossy encoding and lossless encoding. For lossless encoding, a difference between a predicted block and a current block, i.e., a residual signal, is directly entropy-encoded without undergoing discrete cosine transform (DCT). According to the prior art, the residual signal, i.e., a residual block, is entropy-encoded without undergoing a separate process or a differential value formed using pixel values of a neighboring block of the residual block is entropy-encoded, thereby degrading the compression rate and making parallel processing using a pipeline method difficult.

SUMMARY OF THE INVENTION

An aspect of the present invention provides a method and apparatus for lossless video encoding and decoding, in which a differential residual block is generated by calculating a difference between pixels of a residual block resulting from interprediction in units of a predetermined-size block and the differential residual block is encoded, thereby improving the compression rate.

According to one aspect of the present invention, there is provided a method of lossless video encoding. The method includes performing interprediction between a reference frame and a current frame in units of a predetermined-size block to generate a predicted block of a current block to be encoded, generating a residual block composed of residual signals corresponding to differences between pixels of the predicted block and the current block, calculating differences between the residual signals of the residual block in a predetermined direction and generating a differential residual block based on the calculated differences, and performing entropy-encoding on the differential residual block.

According to another aspect of the present invention, there is provided an apparatus for lossless video encoding, the apparatus including an interprediction unit, a subtraction unit, a differential residue transform unit, and an entropy-encoding unit. The interprediction unit performs interprediction between a reference frame and a current frame in units of a predetermined-size block to generate a predicted block of a current block to be encoded. The subtraction unit generates a residual block composed of residual signals corresponding to differences between pixels of the predicted block and the current block. The differential residue transform unit calculates differences between the residual signals of the residual block in a predetermined direction and generates a differential residual block based on the calculated differences. The entropy-encoding unit performs entropy-encoding on the differential residual block.

According to still another aspect of the present invention, there is provided a method of lossless video decoding. The method includes receiving a bitstream that is entropy-encoded using a differential residual block that is generated by calculating differences between pixels of a residual block composed of differences between an interpredicted block and a current block, performing entropy-decoding on the received bitstream to decode the differential residual block, performing an inverse transform on the decoded differential residual block to generate the residual block, and adding the residual block and the interpredicted block using video data included in the bitstream to reconstruct the original picture.

According to yet another aspect of the present invention, there is provided an apparatus for lossless video decoding, the apparatus including an entropy-decoding unit, a differential residue inverse transform unit, an interprediction unit, and an addition unit. The entropy-decoding unit receives a bitstream that is entropy-encoded using a differential residual block that is generated by calculating differences between pixels of a residual block composed of differences between an interpredicted block and a current block and performs entropy-decoding on the received bitstream to output the differential residual block. The differential residue inverse transform unit performs an inverse transform on the differential residual block to generate the residual block. The interprediction unit generates an interpredicted block using video data included in the bitstream. The addition unit adds the residual block and the interpredicted block to reconstruct the original picture.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings.

Figure 1:
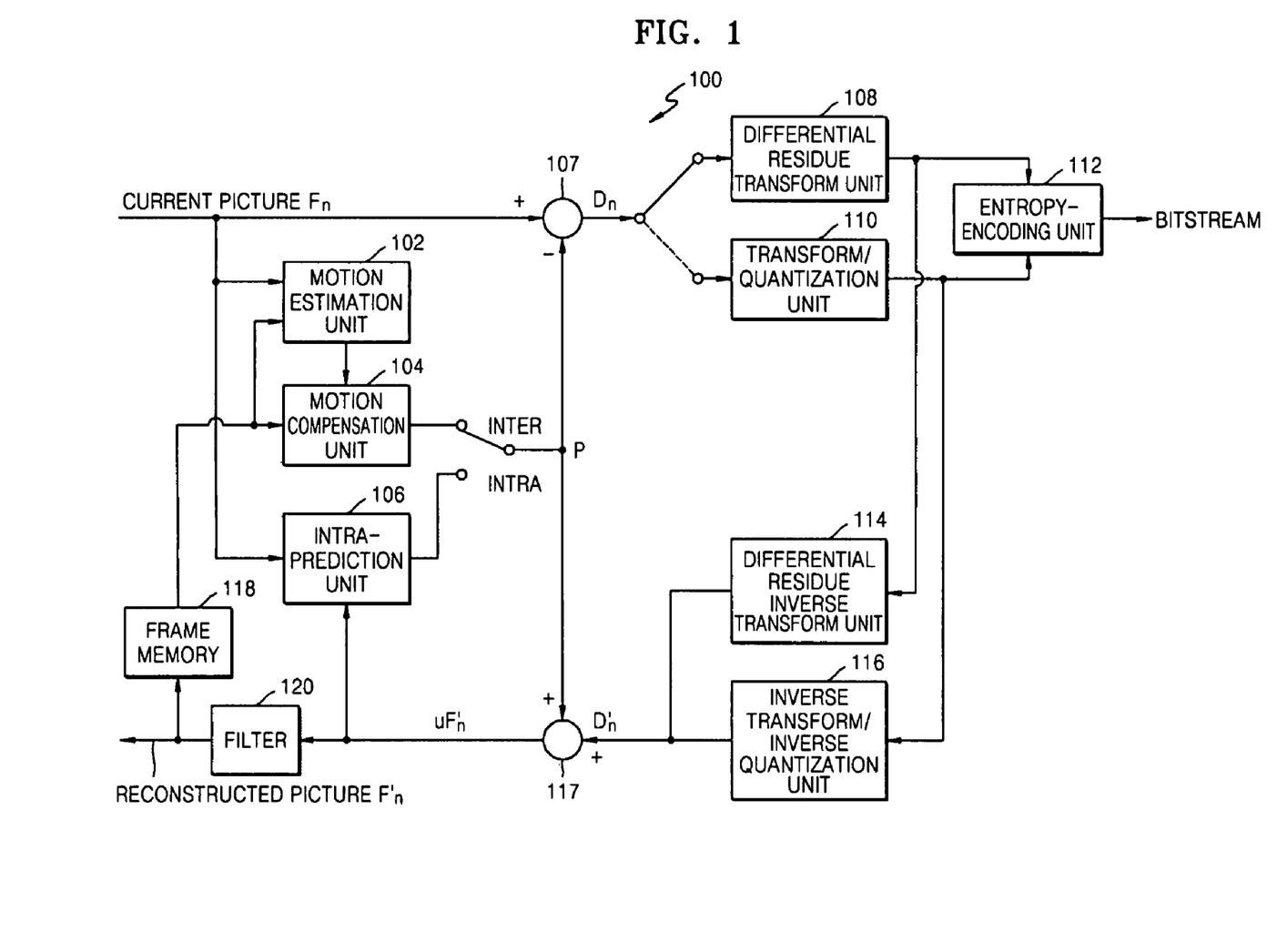
FIG. 1 is a block diagram of a video encoder using an apparatus for lossless video encoding according to the an exemplary embodiment of the present invention.

FIG. 1 is a block diagram of a video encoder 100 using an apparatus for lossless video encoding according to an exemplary embodiment of the present invention.

Referring to FIG. 1, the video encoder 100 includes a motion estimation unit 102, a motion compensation unit 104, an intraprediction unit 106, a subtraction unit 107, a differential residue transform unit 108, a transform/quantization unit 110, an entropy-encoding unit 112, a differential residue inverse transform unit 114, an inverse transform/inverse quantization unit 116, an addition unit 117, a frame memory 118, and a filter 120.

Figure 2:
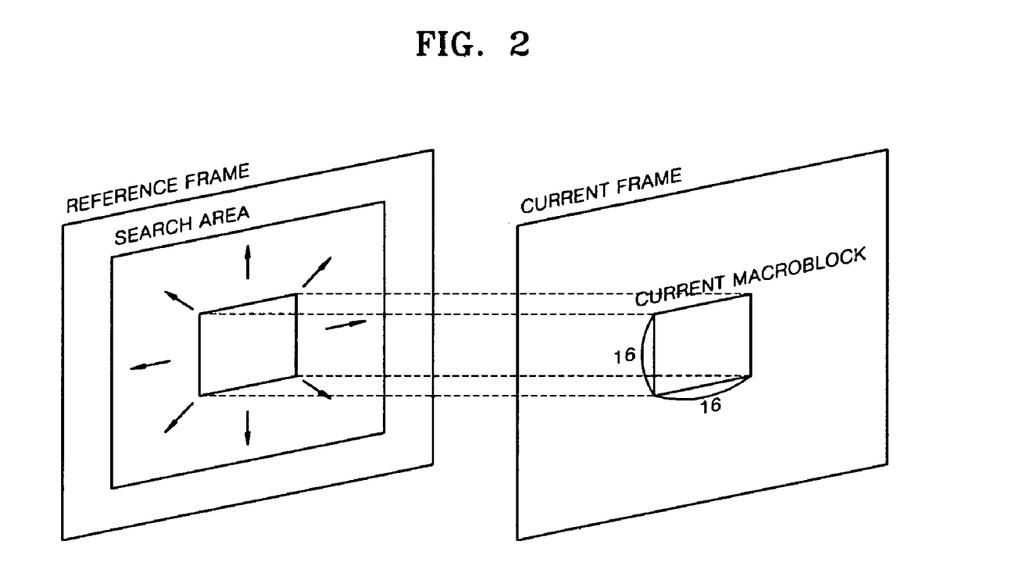
FIG. 2 is a view for explaining motion estimation performed by a motion estimation unit of FIG. 1.

The motion estimation unit 102 performs motion estimation by reading the most similar area to a current macroblock from a reference frame stored in the frame memory 118. More specifically, referring to FIG. 2, which is a view for explaining motion estimation performed by the motion estimation unit 102, the motion estimation unit 102 searches a predetermined area (search area) of a reference frame, which extends from a position corresponding to a current macroblock of a current frame, and selects an area having the smallest difference from the current macroblock as the most similar area. The motion estimation unit 102 outputs a difference between spatial positions of the most similar area and the current macroblock as a motion vector.

The motion compensation unit 104 reads the most similar area from the reference frame stored in the frame memory 118 using the motion vector and generates an interpredicted block. In this way, the motion estimation unit 102 and the motion compensation unit 104 interact with each other, thereby forming an interprediction unit for performing interprediction.

The intraprediction unit 106 performs intraprediction by searching in a current picture for a prediction value of a current block.

Interprediction and intraprediction may be performed in units of not only a 16×16 macroblock but also a 16×8, 8×16, 8×8, 8×4, 4×8, or 4×4 block.

Once a predicted block of a current block to be encoded is formed through interprediction or intraprediction, the subtraction unit 107 calculates a difference between the current block and the predicted block and outputs a residual block $D_n$. In general, a residue is encoded to reduce the amount of data in video encoding.

In the case of lossy encoding, the residual block $D_n$ undergoes a discrete cosine transform (DCT) and quantization in the transform/quantization unit 110 and the quantized residual block $D_n$ is entropy-encoded by the entropy-encoding unit 112 and then output as a bitstream.

In the case of lossless encoding, the residual block $D_n$ is directly entropy-encoded without passing through the transform/quantization unit 110. In particular, in the video encoder 100 according to an exemplary embodiment of the present invention, the residual block $D_n$ resulting from interprediction is transformed into a differential residual block by the differential residue transform unit 108 and the differential residue block is entropy-encoded by the entropy-encoding unit 112 and then output as a bitstream.

Figure 3:
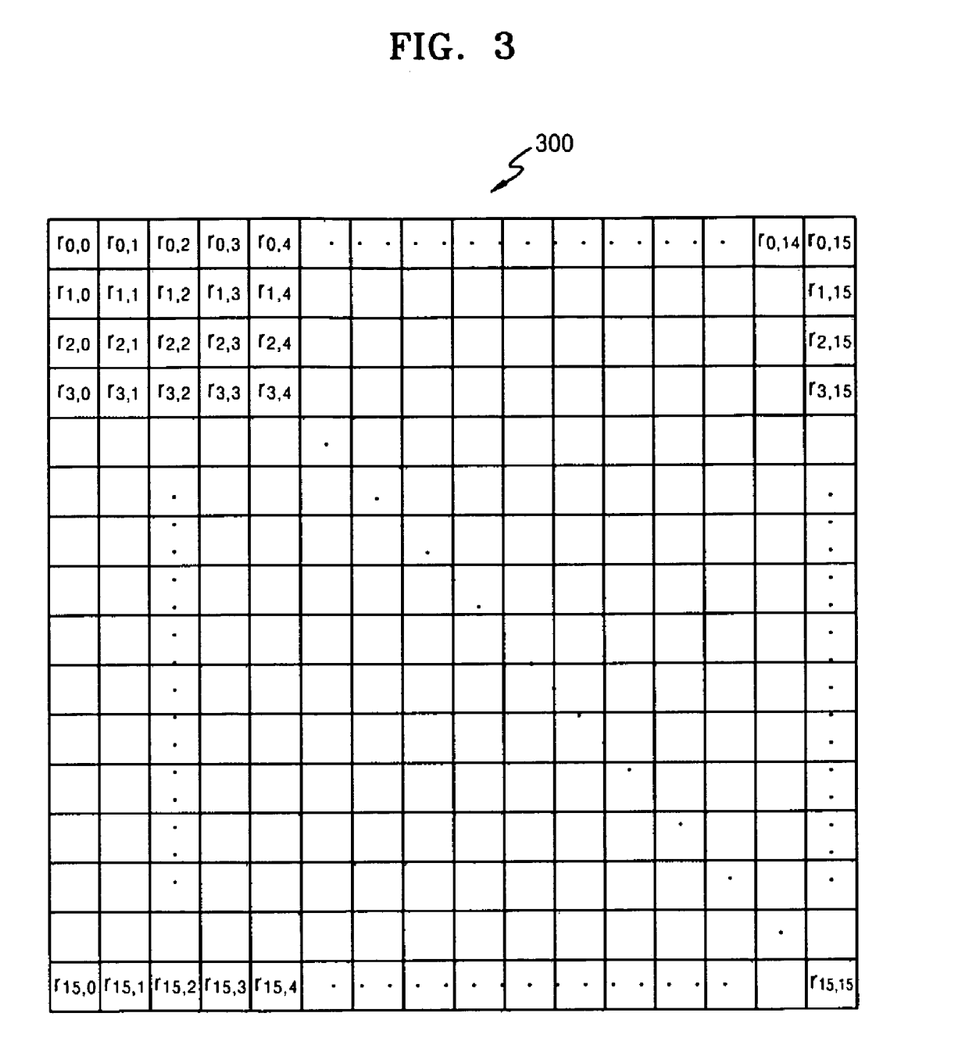
FIG. 3 illustrates a residual block input to a differential residue transform unit of FIG. 1.

FIG. 3 illustrates a residual block input to the differential residue transform unit 108.

As mentioned above, the interpredicted block obtained by the motion estimation unit 102 and the motion compensation unit 104 is subtracted from the current block and, thus, a residual block 300 is output. In FIG. 3, the residual block 300 is an interpredicted residual block corresponding to a 16×16 macroblock and a pixel in an $x^{th}$ row and an $y^{th}$ column of the residual block 300 will be referred to as $r_{x,y}$.

The differential residue transform unit 108 receives a residual block of a predetermined size as illustrated in FIG. 3 and calculates a difference between pixels of the residual block 300 in a predetermined direction, thereby generating a differential residual block. In other words, the differential residue transform unit 108 performs differential pulse code modulation on pixels of the residual block 300 in a horizontal direction or a vertical direction to generate a differential residual block. The reason for the generation of the differential residual block is to improve the compression rate by reducing the size of pixels of the residual block 300.

Figure 4:
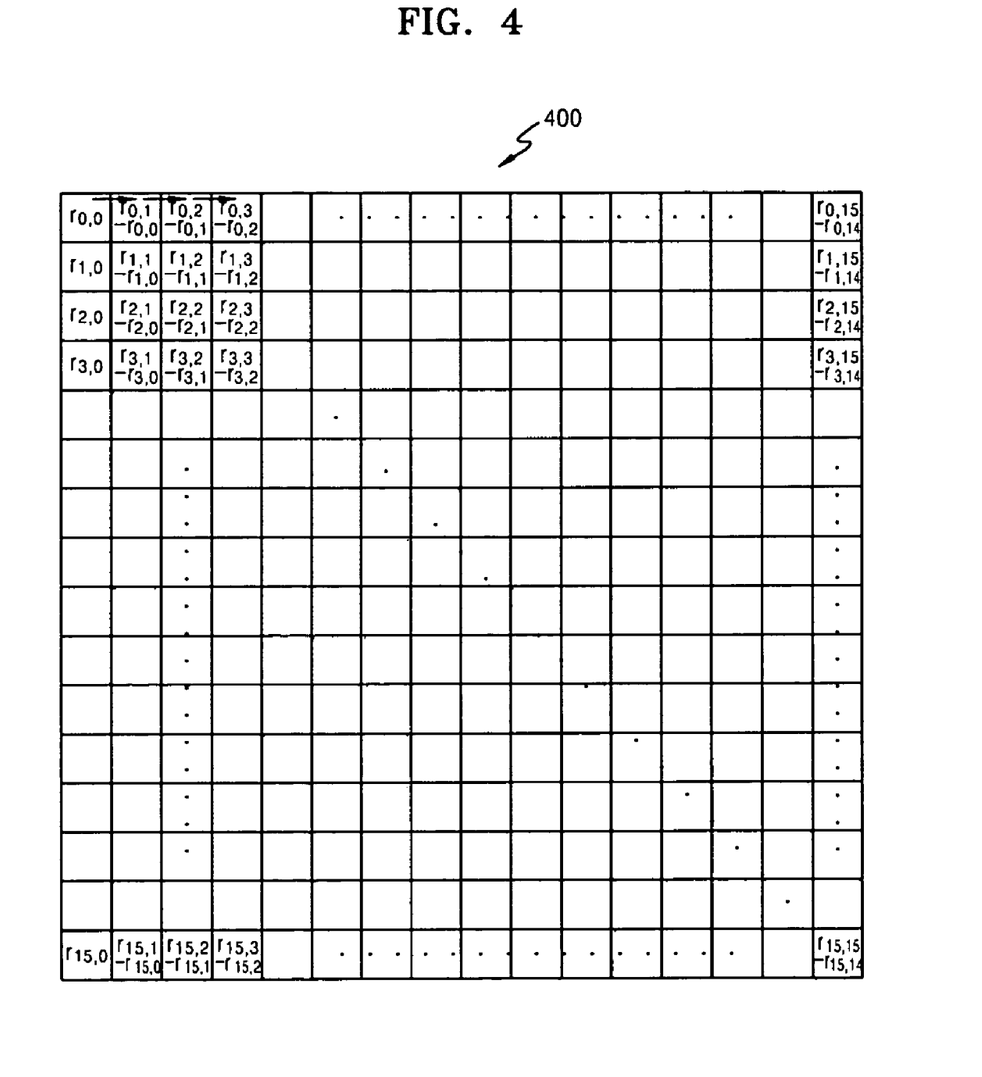
FIG. 4 is a view for explaining generation of a horizontal differential residual block, performed by the differential residue transform unit of FIG. 1.
Figure 5:
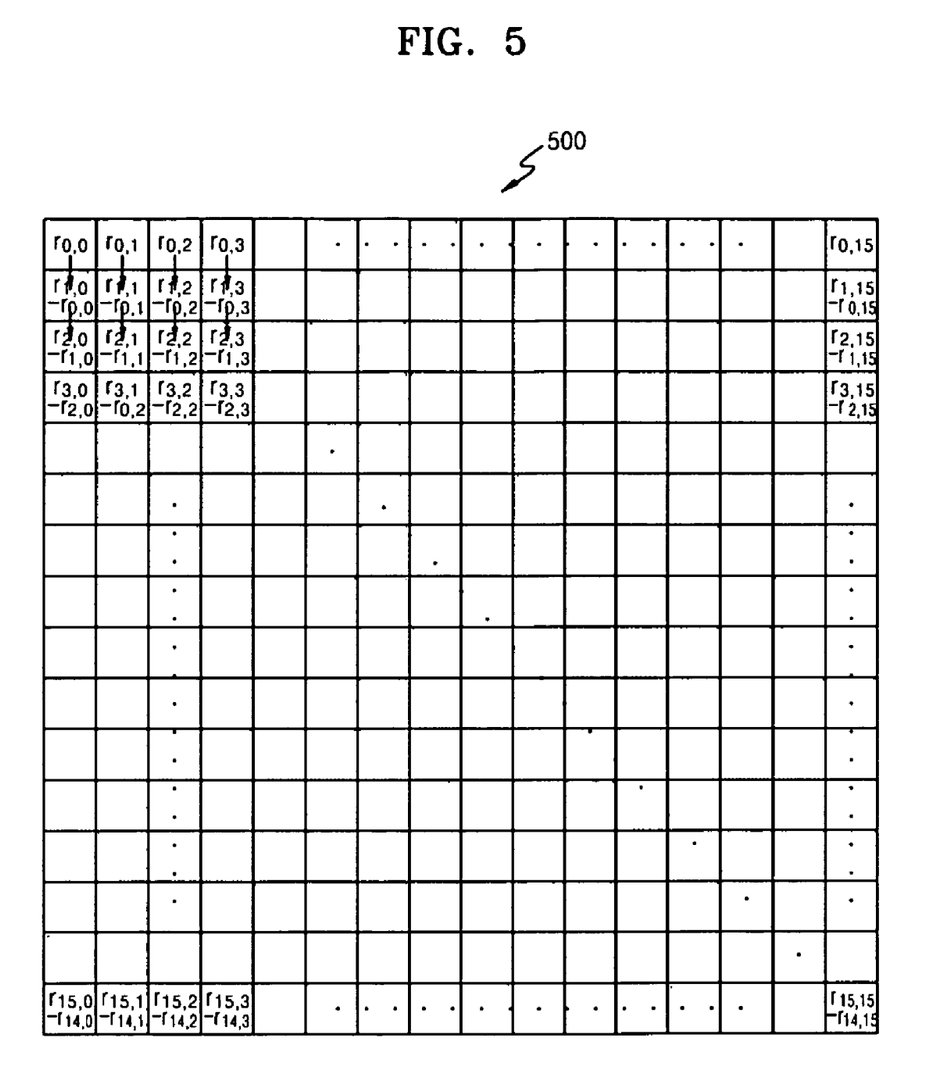
FIG. 5 is a view for explaining generation of a vertical differential residual block, performed by the differential residue transform unit of FIG. 1.
Figure 6:
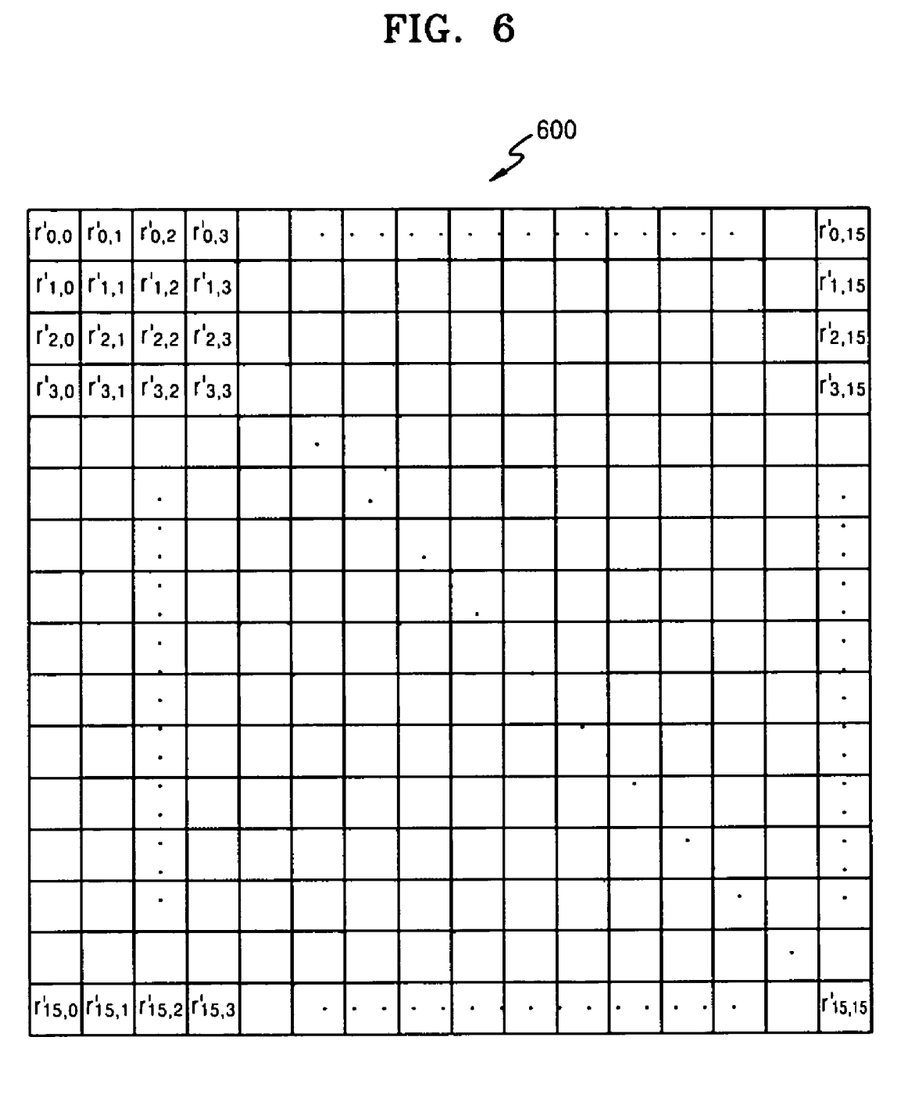
FIG. 6 illustrates a differential residual block generated by the differential residue transform unit of FIG. 1.

FIG. 4 is a view for explaining the generation of a horizontal differential residual block 400, performed by the differential residue transform unit 108, FIG. 5 is a view for explaining the generation of a vertical differential residual block 500, performed by the differential residue transform unit 108, and FIG. 6 illustrates a differential residual block 600 generated by the differential residue transform unit 108.

Referring to FIG. 4, the differential residue transform unit 108 generates the horizontal differential residual block 400 composed of pixels generated by subtracting a horizontally neighboring pixel from the respective pixels. In other words, when a pixel in an $x^{th}$ row and an $y^{th}$ column of the residual block 300 is $r_{x,y}$, a pixel $r'_{x,y}$ in an $x^{th}$ row and an $y^{th}$ column of the horizontal differential residual block 400 is calculated as follows:

$$r'_{x,y} = r_{x,y} - r_{x,y-1} \quad (1),$$

where pixels in the $1^{st}$ column of the horizontal differential residual block 400, i.e., $r'_{0,0}, r'_{1,0}, r'_{2,0}, \ldots, r'_{15,0}$, are the same as those in the $1^{st}$ column of the residual block 300. In other words, $r'_{N,0} = r_{N,0}$ (N=0, 1, 2, ..., 15).

Referring to FIG. 5, the differential residue transform unit 108 generates the vertical differential residual block 500 composed of pixels generated by subtracting a vertically neighboring pixel from the respective pixels. In other words, when a pixel in an $x^{th}$ row and an $y^{th}$ column of the residual block 300 is $r_{x,y}$, a pixel $r'_{x,y}$ in an xth row and an yth column of the vertical differential residual block 500 is calculated as follows:

$$r'_{x,y} = r_{x,y} - r_{x-1,y} \quad (2),$$

where pixels in the $1^{st}$ row of the vertical differential residual block 500, i.e., $r'_{0,0}, r'_{0,1}, r'_{0,2}, \ldots, r'_{0,15}$, are the same as those in the $1^{st}$ row of the residual block 300. In other words, $r'_{0,N}=r_{0,N}$ (N=0, 1, 2, ..., 15).

The horizontal differential residual block 400 or the vertical differential residual block 500 generated by the differential residue transform unit 108 is directly input to the entropy coding unit 112 without undergoing any transform and quantization in order to be lossless-encoded through context adaptive binary arithmetic coding (CABAC).

The differential residual block output by the differential residue transform unit 108 is inversely transformed into a residual block as illustrated in FIG. 3 by the differential residue inverse transform unit 114 and is added to the interpredicted block by the addition unit 117 for reconstruction. Here, an inverse transform of the differential residual block may be performed by summing up pixels positioned in a predetermined direction with respect to a current pixel to be inversely transformed in the differential residual block. More specifically, when the entropy-encoded differential residual block has been generated using differences between horizontally neighboring pixels and a pixel in an $x^{th}$ row and an $y^{th}$ column of the inversely transformed differential residual block is $r'_{x,y}$, the differential residue inverse transform unit 114 calculates a pixel $r_{x,y}$ in an $x^{th}$ row and an $y^{th}$ column of the residual block as follows:

$$r_{x,y} = \sum_{i=0}^{y} r'_{x,i} \quad (3)$$

When the entropy-encoded differential residual block has been generated using differences between vertically neighboring pixels, the differential residue inverse transform unit 114 calculates a pixel $r_{x,y}$ in an $x^{th}$ row and an $y^{th}$ column of the residual block as follows:

$$r_{x,y} = \sum_{i=0}^{x} r'_{i,y} \quad (4)$$

The residual block quantized according to conventional encoding instead of encoding of this exemplary embodiment of the present invention is reconstructed by the inverse transform/inverse quantization unit 116. The reconstructed block passes through the filter 120 that performs deblocking filtering and is stored in the frame memory 118 for use in interprediction of a next picture.

Figure 7:
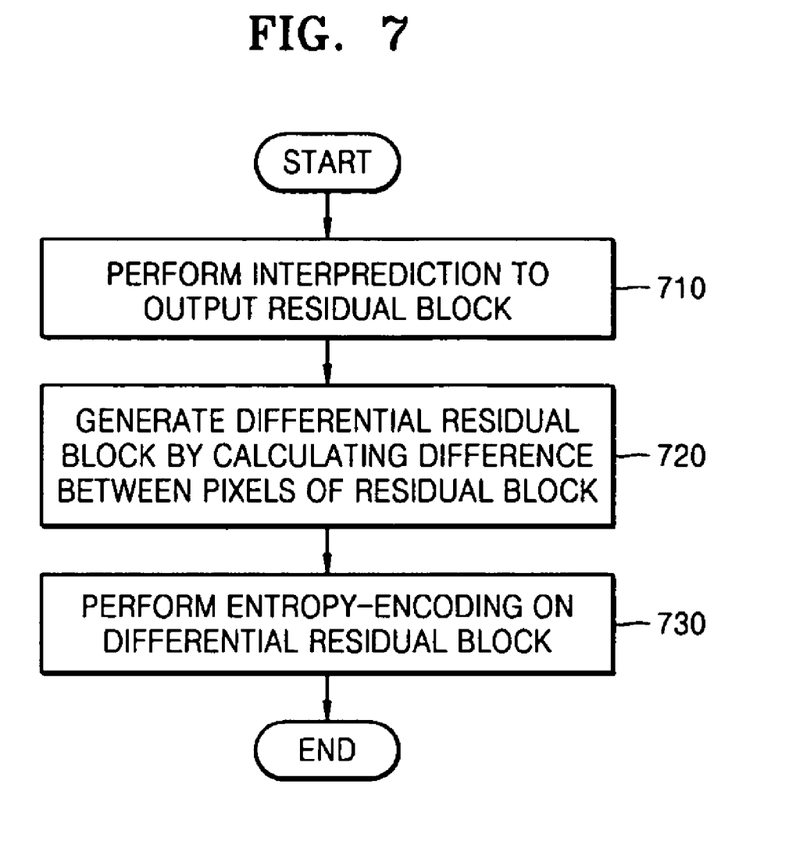
FIG. 7 is a flowchart illustrating a method of lossless video encoding according to an exemplary embodiment of the present invention.

FIG. 7 is a flowchart illustrating a method of lossless video encoding according to an exemplary embodiment of the present invention.

Referring to FIG. 7, in operation 710, an interprediction unit including the motion estimation unit 102 and the motion compensation unit 104 perform interprediction between a reference frame and a current frame in units of a predetermined-size block to generate a predicted block of a current block to be encoded and outputs a residual block corresponding to a difference between the predicted block and the current block.

In operation 720, a differential residual block is generated by calculating a difference between pixels of the residual block in a predetermined direction. To generate the differential residual block, Equation 1 or 2 may be used.

In operation 730, entropy-encoding is performed on the differential residual block to output a bitstream.

Figure 8:
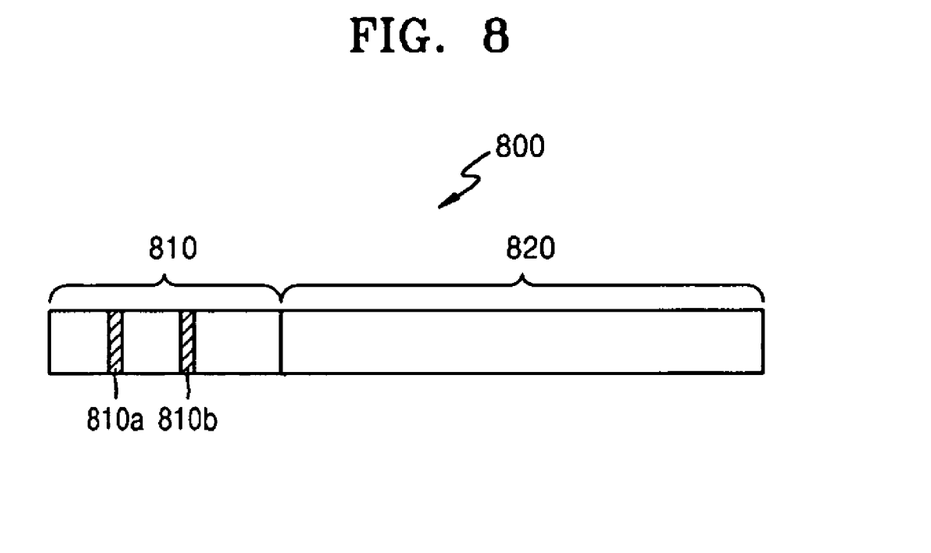
FIG. 8 illustrates the format of a bitstream output from the video encoder according to an exemplary embodiment of the present invention.

FIG. 8 illustrates the format of a bitstream 800 output from the video encoder 100 according to an embodiment of the present invention.

Referring to FIG. 8, the bitstream 800 includes a header 810 having encoding mode information and a data portion 820 having information about a transform coefficient or a motion vector. In terms of compression rate, entropy-encoding using the differential residual block may exhibit inferior performance compared to conventional entropy-encoding using a residual block that is not transformed. Thus, the entropy-encoding unit 112 compares a cost of a mode in which the differential residual block is entropy-encoded and a cost of a mode in which the residual block is transformed, quantized, and then entropy-encoded, and determines a mode having the smaller cost as a final encoding mode. The entropy-encoding unit 112 also adds a predetermined bit 810a indicating the final encoding mode to the header 810 of the bitstream 800 to inform a video decoder receiving the bitstream 800 of an encoding mode in which the bitstream 800 has been encoded.

When the entropy-encoding unit 112 performs entropy-encoding on the differential residual block, it may add information indicating a predetermined direction used when subtracting the neighboring pixels for the generation of the differential residual block to the header 810 of the bitstream 800. For example, the entropy-encoding unit 112 may add a bit 810b indicating which one of the horizontal direction and the vertical direction is used in subtraction of pixels of the residual block for generation of the differential residual block to the header 810 of the bitstream 800.

Figure 9:
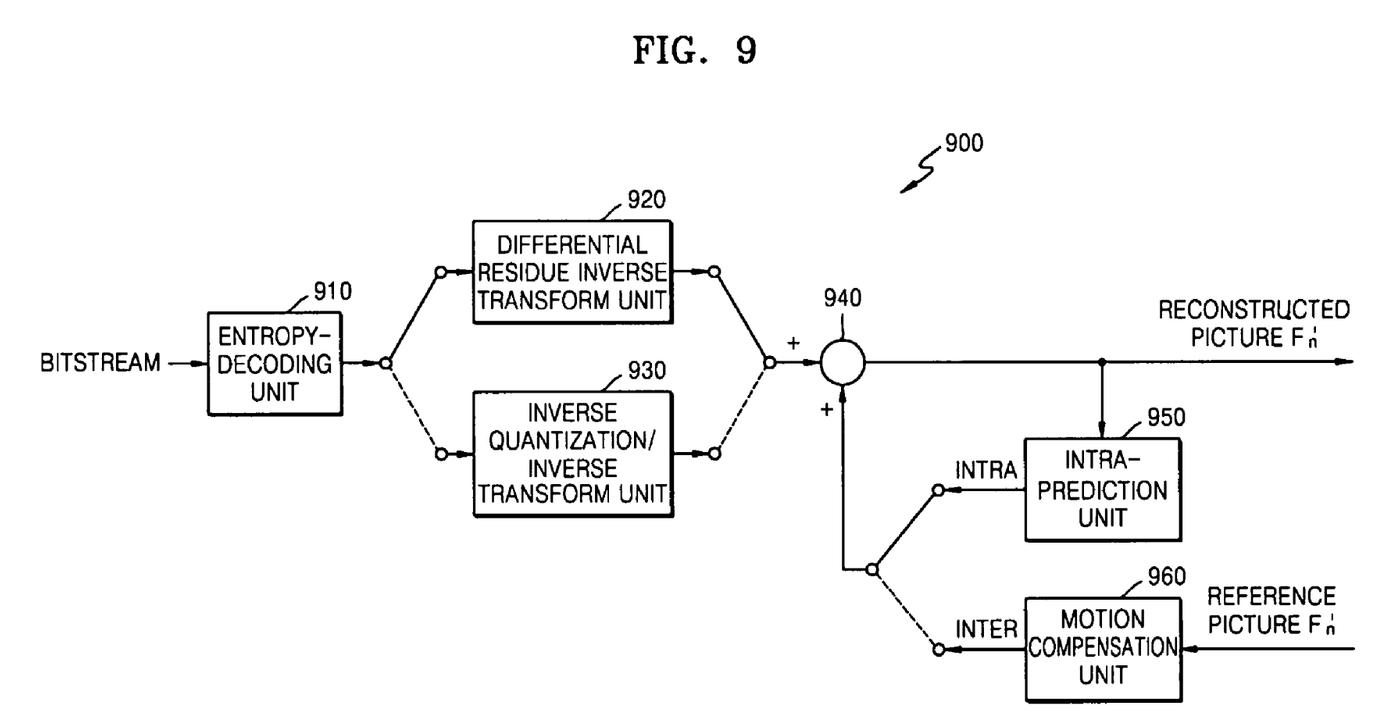
FIG. 9 is a block diagram of a video decoder to which an apparatus for lossless video decoding according to an exemplary embodiment of the present invention is applied.

FIG. 9 is a block diagram of a video decoder 900 using an apparatus for lossless video decoding according to an embodiment of the present invention.

Referring to FIG. 9, the video decoder 900 includes an entropy-decoding unit 910, a differential residue inverse transform unit 920, an inverse quantization/inverse transform unit 930, an addition unit 940, an intraprediction unit 950, and a motion compensation unit 960.

When the entropy-decoding unit 910 receives a bitstream encoded using a method of lossless video encoding according to this embodiment of the present invention, it entropy-decodes the bitstream and outputs a differential residual block. When the entropy-decoding unit 910 receives a bitstream encoded according to the prior art, it entropy-decodes the bitstream and outputs a residual block. As mentioned above, the entropy-decoding unit 910 can determine an encoding mode in which a bitstream to be decoded has been encoded from encoding mode information included in a header of the bitstream.

The differential residue inverse transform unit 920 performs an inverse transform on the input differential residual block to generate a residual block. The differential residue inverse transform unit 920 operates in the same way as the differential residue inverse transform unit 114 of FIG. 1. More specifically, when the differential residual block 600 decoded by the entropy-decoding unit 910 illustrated in FIG. 6 is input, the differential residue inverse transform unit 920 generates a residual block using Equation 3 or 4 based on a predetermined direction used in subtraction for generation of pixels of the differential residual block 600. Here, Equation 3 is used when the differential residual block 600 has been generated through subtraction between horizontally neighboring pixels, and Equation 4 is used when the differential residual block 600 has been generated through subtraction between vertically neighboring pixels. For example, when the differential residual block 600 has been generated through subtraction between horizontally neighboring pixels, a pixel $r_{x,y}$ of a residual block may be calculated from the differential residual block 600 as follows:

$$r_{N,0} = r'_{N,0} (N=0, 1, 2, \ldots, 15)$$

$$r_{N,1} = r'_{N,0} + r'_{N,1}$$

$$r_{N,2} = r'_{N,0} + r'_{N,1} + r'_{N,2}$$

...

$$r_{N,15} = r'_{N,0} + r'_{N,1} + r'_{N,2} + r'_{N,3} + \ldots + r'_{N,11} + r'_{N,12} + r'_{N,13} + r'_{N,14} + r'_{N,15}$$

Similarly, when the differential residual block 600 has been generated through subtraction between vertically neighboring pixels, a pixel $r_{x,y}$ of a residual block may be calculated from the differential residual block 600 as follows:

$$r_{0,N} = r'_{0,N} (N=0, 1, 2, \ldots, 15)$$

$$r_{1,N} = r'_{0,N} + r'_{1,N}$$

$$r_{2,N} = r'_{0,N} + r'_{1,N} + r'_{2,N}$$

...

$$r_{15,N} = r'_{0,N} + r'_{1,N} + r'_{2,N} + r'_{3,N} + \ldots + r'_{11,N} + r'_{12,N} + r'_{13,N} + r'_{14,N} + r'_{15,N}$$

The motion compensation unit 960 generates an interpredicted block using video data included in the bitstream. The interpredicted block is added to the reconstructed residual block by the addition unit 940 to reconstruct the original picture.

The inverse quantization/inverse transform unit 930 performs an inverse quantization/inverse transform on a bitstream encoded through lossy encoding to generate a residual block. The intraprediction unit 950 and the motion compensation unit 960 generate a predicted block according to an encoded picture type using decoded header information. Then, the generated predicted block is added to the residual block by the addition unit 940 to reconstruct the original picture.

Figure 10:
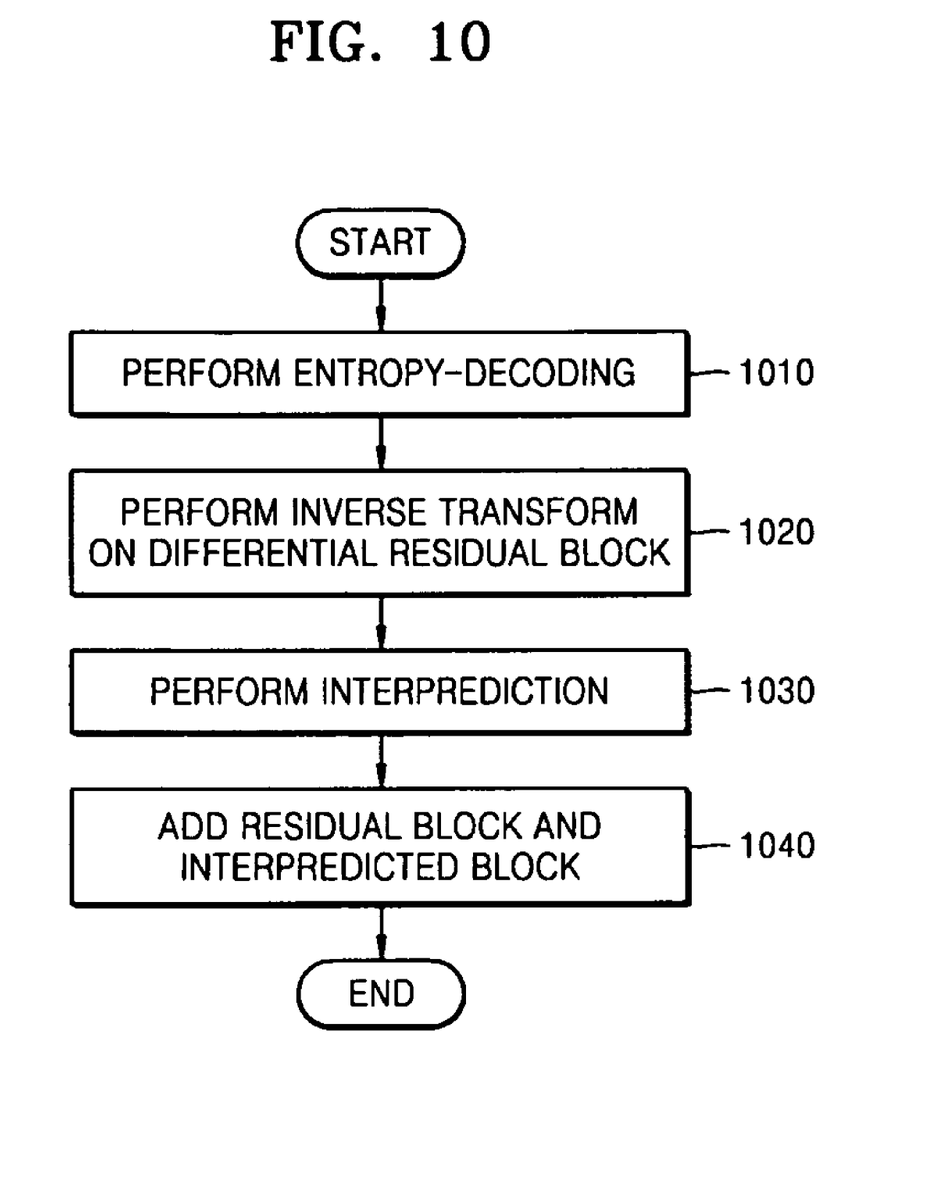
FIG. 10 is a flowchart illustrating a method of lossless video decoding according to an exemplary embodiment of the present invention.

FIG. 10 is a flowchart illustrating a method of lossless video decoding according to an exemplary embodiment of the present invention.

Referring to FIG. 10, in operation 1010, the entropy-decoding unit 910 receives a bitstream encoded by a method of lossless video encoding according to an exemplary embodiment of the present invention and performs entropy-decoding on the bitstream to output a differential residual block.

In operation 1020, the differential residue inverse transform unit 920 performs an inverse transform on the differential residual block to generate a residual block. As stated above, for the generation of the differential residual block, Equation 3 or 4 may be used based on the predetermined direction used in the subtraction of pixels.

In operation 1030, the motion compensation unit 960 performs interprediction using video data included in the bitstream to generate a predicted block.

In operation 1040, the addition unit 940 adds the residual block generated by the differential residue inverse transform unit 920 and the predicted block generated by the motion compensation unit 960 to reconstruct the original picture.

Table 1 shows compression rates when RGB 4:4:4 format JVT test sequences are compressed by encoding according to the prior art and lossless encoding according to an embodiment of the present invention. In the test, a horizontal or vertical differential residual block is entropy-encoded in units of a 16×16 macroblock.

TABLE 1

| | Total bits | | | |
|---|---|---|---|---|
| Sequences | Prior art | Exemplary Embodiment of the Present invention | Saving bits | Saving ratio |
| Analog TV | 2869478616 | 2455621474 | 413857142 | 14.42% |
| Cardtoss | 2588812120 | 2374566808 | 214245312 | 8.28% |
| Dinner | 2582247432 | 2412085245 | 170162187 | 6.59% |
| Bicycle | 1864307320 | 1760634247 | 103673073 | 5.56% |
| Tomatoes | 2614905896 | 2276470749 | 338435147 | 12.94% |
| Average | — | — | 248074572 | 9.56% |

Referring to Table 1, when a differential residual block is encoded according to this embodiment of the present invention, the compression rate increases by an average of 9.5% compared to encoding according to the prior art.

As described above, according to this embodiment, the compression rate can be improved in lossless encoding of a residual block resulting from interprediction. In addition, unlike the prior art where pixels of a previous block are used, a differential residual block is formed using pixels of a residual block that is entropy-encoded, this exemplary embodiment improves the compression rate without significantly changing the processing speed through parallel processing using a pipeline method.

The method of lossless video encoding and decoding according to the exemplary embodiments of the present invention can also be embodied as a computer program. Codes and code segments forming the computer program can be easily construed by computer programmers skilled in the art. Also, the computer program is stored in a computer readable media and read and executed by a computer, thereby implementing the method for detecting an error. Examples of the computer readable media include magnetic tapes, optical data storage devices, and carrier waves.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of lossless video encoding, the method comprising:
   generating a residual block composed of residual signals corresponding to differences between pixels of a predicted block and a current block;
   calculating differences between the residual signals of the residual block in a predetermined direction and generating a differential residual block based on the calculated differences; and
   performing entropy-encoding on the differential residual block;
   wherein the method of lossless video encoding is carried out by a computer comprising a computer processor.

2. The method of claim 1, wherein the predetermined direction is at least one of a horizontal direction and a vertical direction.

3. The method of claim 1, wherein when a pixel in an $x^{th}$ row and a $y^{th}$ column of the residual block is referred to as $r_{x,y}$, a pixel $r'_{x,y}$ in an $x^{th}$ row and an $y^{th}$ column of the differential residual block except for pixels in the 1st column of the differential residual block is calculated by $r'_{x,y} = r_{x,y} - r_{x,y-1}$.

4. The method of claim 1, wherein when a pixel in an $x^{th}$ row and a $y^{th}$ column of the residual block is $r_{x,y}$, a pixel $r'_{x,y}$ in an $x^{th}$ row and an $y^{th}$ column of the differential residual block except for pixels in the 1st row of the differential residual block is calculated by $r'_{x,y} = r_{x,y} - r_{x-1,y}$.

5. The method of claim 1, further comprising:
comparing a first cost of a first mode in which the differential residual block is entropy-encoded and a second cost of a second mode in which the residual block is transformed, quantized, and then entropy-encoded, and determining a final encoding mode based on the smaller of the first cost and the second cost.

6. The method of claim 5, further comprising adding a predetermined bit indicating the final encoding mode to a header of a bitstream.

7. The method of claim 1, further comprising adding a predetermined bit indicating information about the predetermined direction to a header of a bitstream.

8. The method of claim 1, further comprising performing interprediction between a reference frame and a current frame in units of a predetermined size block to generate the predicted block of the current block to be encoded.

9. An apparatus for lossless video encoding, the apparatus comprising:
a subtraction unit which generates a residual block composed of residual signals corresponding to differences between pixels of a predicted block and a current block;
a differential residue transform unit which calculates differences between the residual signals of the residual block in a predetermined direction and generates a differential residual block based on the calculated differences; and
an entropy-encoding unit which performs entropy-encoding on the differential residual block;
wherein the apparatus for lossless video encoding comprises at least a computer processor, the computer processor performing the function of at least one of the subtraction unit, the differential residue transform unit, and the entropy-encoding unit.

10. The apparatus of claim 9, wherein when the predetermined direction is a horizontal direction and a pixel in an $x^{th}$ row and an $y^{th}$ column of the residual block is $r_{x,y}$, the differential residue transform unit calculates a pixel $r'_{x,y}$ in an $x^{th}$ row and an $y^{th}$ column of the differential residual block except for pixels in the 1st column of the differential residual block using $r'_{x,y} = r_{x,y} - r_{x,y-1}$.

11. The apparatus of claim 9, wherein when the predetermined direction is a vertical direction and a pixel in an $x^{th}$ row and an $y^{th}$ column of the residual block is $r_{x,y}$, the differential residue transform unit calculates a pixel $r'_{x,y}$ in an $x^{th}$ row and an $y^{th}$ column of the differential residual block except for pixels in the 1st row of the differential residual block using $r'_{x,y} = r_{x,y} - r_{x-1,y}$.

12. The apparatus of claim 9, wherein the entropy-encoding unit compares a first cost of a first mode in which the differential residual block is entropy-encoded and a second cost of a second mode in which the residual block is transformed, quantized, and then entropy-encoded, and determines a final encoding mode based on the smaller of the first cost and the second cost.

13. The apparatus of claim 12, wherein the entropy-encoding unit adds a predetermined bit indicating the final encoding mode to a header of a bitstream.

14. The apparatus of claim 12, wherein the entropy-encoding unit adds a predetermined bit indicating information about the predetermined direction to a header of a bitstream.

15. The apparatus of claim 9, further comprising an interprediction unit which performs interprediction between a reference frame an a current frame in units of a predetermined size block to generate the predicted block of the current block to be encoded.

16. A method of lossless video decoding, the method comprising:
receiving a bitstream comprising an entropy-encoded differential residual block that is generated by calculating differences between pixels of a residual block composed of differences between an interpredicted block and a current block;
performing entropy-decoding on the received bitstream to decode the entropy-encoded differential residual block to create a decoded differential residual block;
performing an inverse transform on the decoded differential residual block to regenerate the residual block; and
adding the residual block and the interpredicted block using video data included in the bitstream to reconstruct an original picture;
wherein the method of lossless video decoding is carried out by a computer comprising a computer processor.

17. The method of claim 16, wherein the inverse transform of the decoded differential residual block is performed by summing up pixels positioned in a predetermined direction with respect to a current pixel to be inversely transformed in the decoded differential residual block.

18. The method of claim 16, wherein when the entropy-encoded differential residual block has been generated using differences between horizontally neighboring pixels and a pixel in an $x^{th}$ row and an $y^{th}$ column of the inversely transformed decoded differential residual block is $r'_{x,y}$, the inverse transform of the decoded differential residual block comprises calculating a pixel $r_{x,y}$ in an $x^{th}$ row and an $y^{th}$ column of the residual block using $$r_{x,y} = \sum_{i=0}^{y} r'_{x,i}.$$

19. The method of claim 16, wherein when the entropy-encoded differential residual block has been generated using differences between vertically neighboring pixels and a pixel in an $x^{th}$ row and an $y^{th}$ column of the inversely transformed decoded differential residual block is $r'_{x,y}$, the inverse transform of the decoded differential residual block comprises calculating a pixel $r_{x,y}$ in an $x^{th}$ row and an $y^{th}$ column of the residual block using $$r_{x,y} = \sum_{i=0}^{x} r'_{i,y}.$$

20. An apparatus for lossless video decoding, the apparatus comprising:
an entropy-decoding unit which receives a bitstream that is entropy-encoded using a differential residual block that is generated by calculating differences between pixels of a residual block composed of differences between an interpredicted block and a current block and performs entropy-decoding on the received bitstream to output the differential residual block;

a differential residue inverse transform unit which performs inverse transform on the differential residual block to regenerate the residual block;

an interprediction unit which generates an interpredicted block using video data included in the bitstream; and an addition unit which adds the residual block and the interpredicted block to reconstruct the original picture;

wherein the apparatus for lossless video decoding comprises at least a computer processor, the computer processor performing the function of at least one of the entropy-decoding unit, the differential residue inverse transform unit, and the addition unit.

21. The apparatus of claim 20, wherein the differential residue inverse transform unit sums up pixels positioned in a predetermined direction with respect to a current pixel to be inversely transformed in the decoded differential residual block.

22. The apparatus of claim 20, wherein when the entropy-encoded differential residual block has been generated using differences between horizontally neighboring pixels and a pixel in an $x^{th}$ row and an $y^{th}$ column of the inversely transformed decoded differential residual block is $r'_{x,y}$, the differential residue inverse transform unit calculates a pixel $r_{x,y}$ in an $x^{th}$ row and an $y^{th}$ column of the residual block using $$r_{x,y} = \sum_{i=0}^{y} r'_{x,i}.$$

23. The apparatus of claim 20, wherein when the entropy-encoded differential residual block has been generated using differences between vertically neighboring pixels and a pixel in an $x^{th}$ row and an $y^{th}$ column of the inversely transformed decoded differential residual block is $r'_{x,y}$, the differential residue inverse transform unit calculates a pixel $r_{x,y}$ in an $x^{th}$ row and an $y^{th}$ column of the residual block using $$r_{x,y} = \sum_{i=0}^{x} r'_{i,y}.$$

* * * * *